No. 754,937. PATENTED MAR. 15, 1904.
R. L. PATTERSON.
MEASURING AND WEIGHING MECHANISM.
APPLICATION FILED NOV. 19, 1901.
NO MODEL. 5 SHEETS—SHEET 1.

WITNESSES

INVENTOR:
Rufus L. Patterson,
BY Dodge and Sons,
ATTYS.

No. 754,937. PATENTED MAR. 15, 1904.
R. L. PATTERSON.
MEASURING AND WEIGHING MECHANISM.
APPLICATION FILED NOV. 19, 1901.
NO MODEL. 5 SHEETS—SHEET 2.

WITNESSES:
INVENTOR:
Rufus L. Patterson,
BY Dodge and Sons
ATTYS

No. 754,937. PATENTED MAR. 15, 1904.
R. L. PATTERSON.
MEASURING AND WEIGHING MECHANISM.
APPLICATION FILED NOV. 19, 1901.
NO MODEL. 5 SHEETS—SHEET 4.

Witnesses
Inventor
Rufus L. Patterson
Attorneys

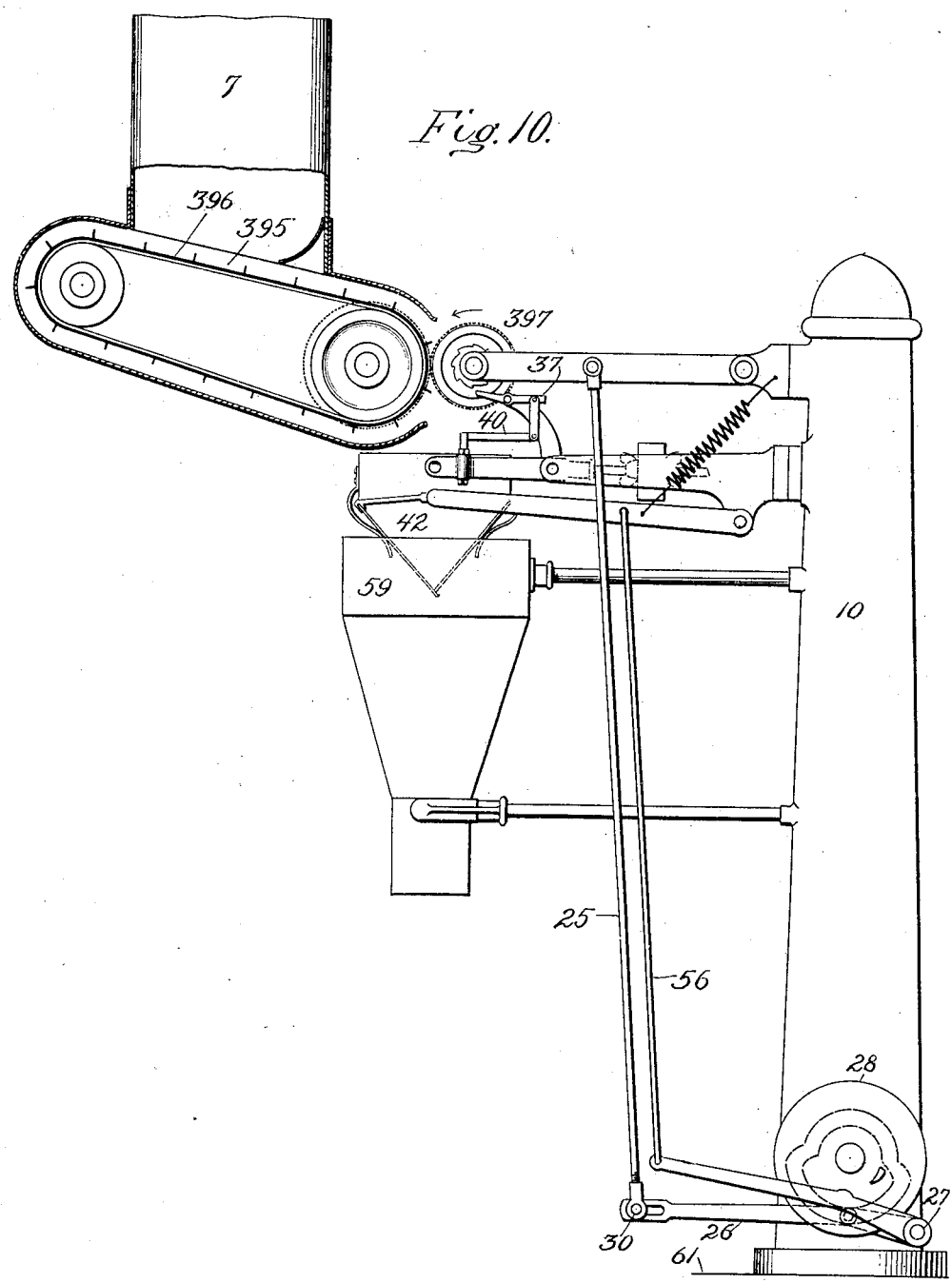

No. 754,937. Patented March 15, 1904.

UNITED STATES PATENT OFFICE.

RUFUS L. PATTERSON, OF NEW YORK, N. Y.

MEASURING AND WEIGHING MECHANISM.

SPECIFICATION forming part of Letters Patent No. 754,937, dated March 15, 1904.

Original application filed August 20, 1897, Serial No. 648,936. Divided and this application filed November 19, 1901. Serial No. 82,907. (No model.)

*To all whom it may concern:*

Be it known that I, RUFUS L. PATTERSON, a citizen of the United States, residing at New York city, in the borough of Manhattan and State of New York, have invented certain new and useful Improvements in Measuring and Weighing Mechanism, of which the following is a specification.

My invention pertains to machinery for packing tobacco and other merchandise. The complete machine is designed to measure the substance to be packed, to weigh it with great nicety, to place it in bags or other holders and compress it therein, to apply a revenue-stamp to the package, to apply a label, (one or more,) and, if desired, in the case of tobacco, to introduce a package of cigarette-papers, a card, or other token beneath one of the labels, and, finally, to deliver the finished packages in regular order to a tray or receptacle. The present application, however, is confined to the measuring and weighing apparatus, this case being divided out of application Serial No. 648,936, filed in the Patent Office on the 20th day of August, 1897, in compliance with the requirements of said office. Inasmuch as it is expected to retain in the parent case a description and illustration of the machine in its complete form it is deemed advisable to retain in the present description the designations of parts used in the original application in order that the two may be read together without confusion.

Figure 1:
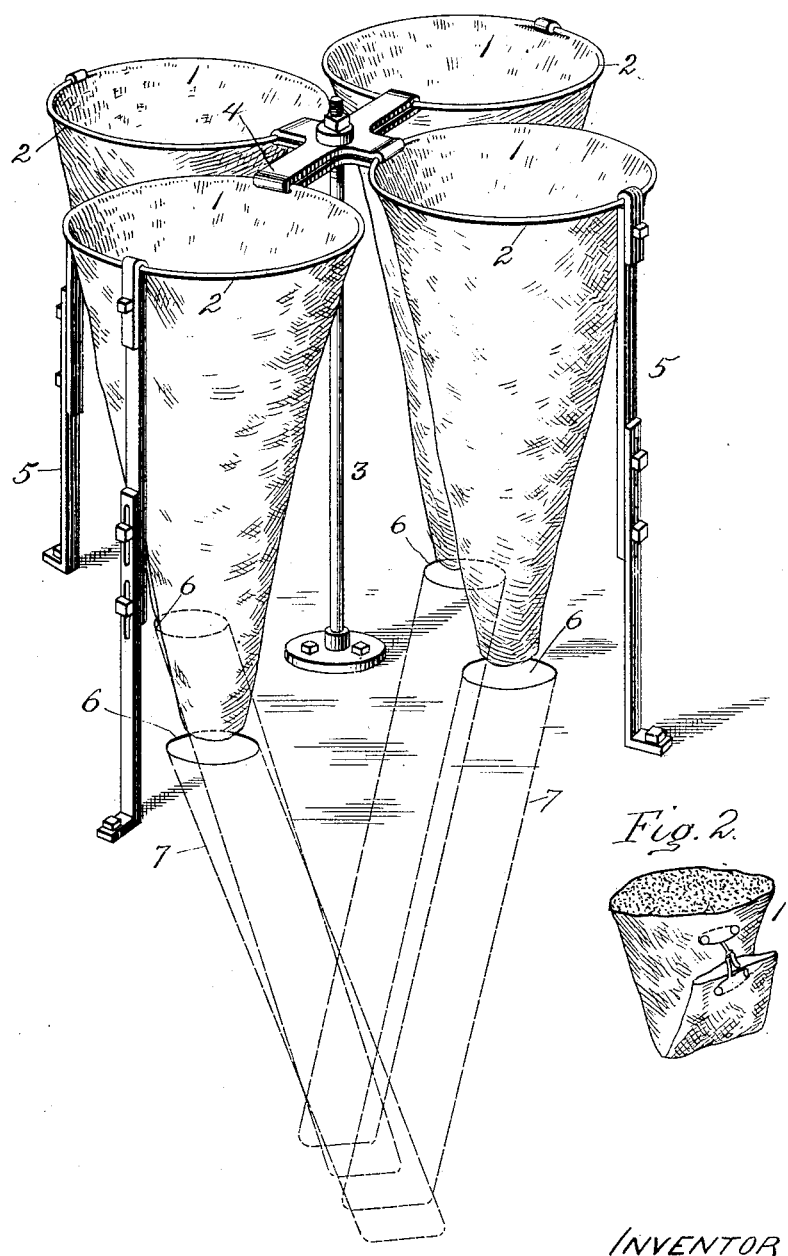
Figure 2:
Figure 3:
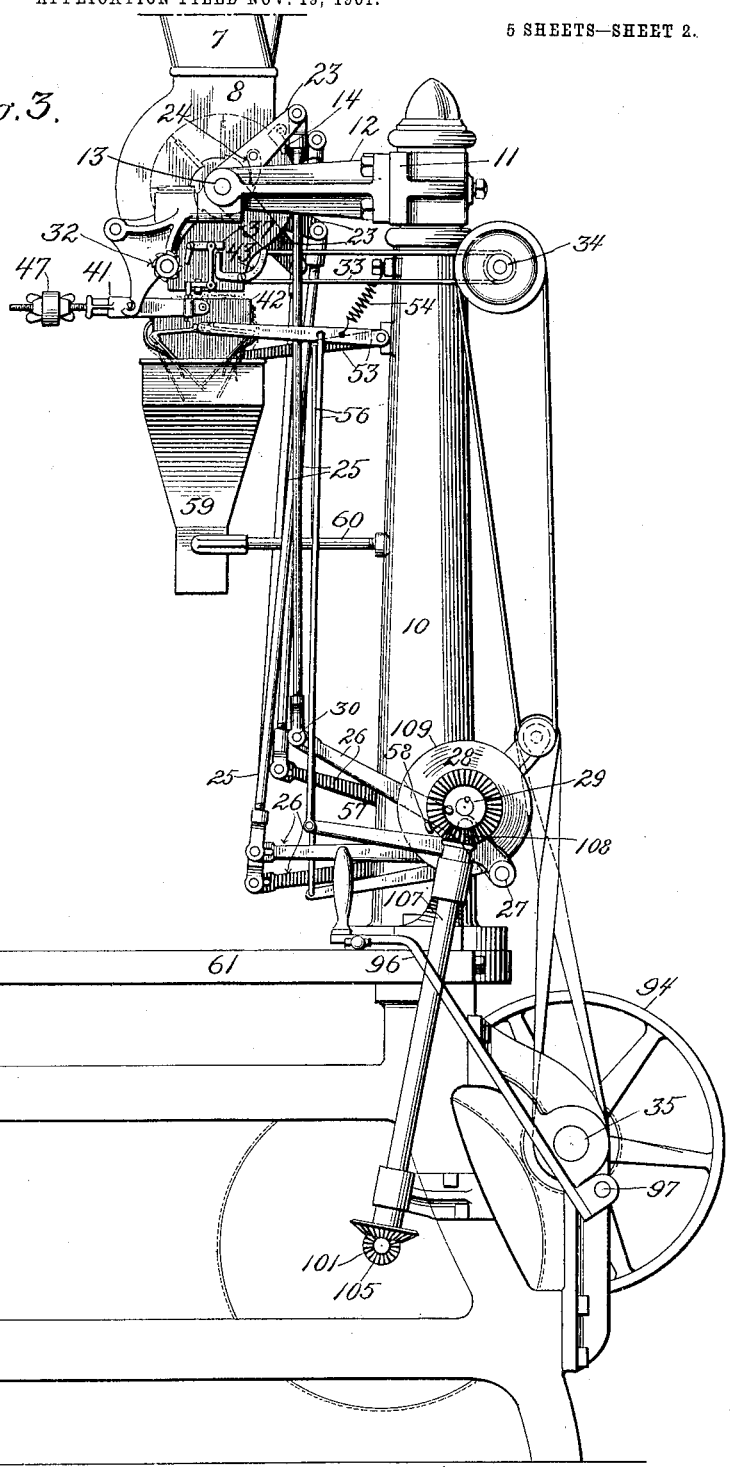
Figure 4:
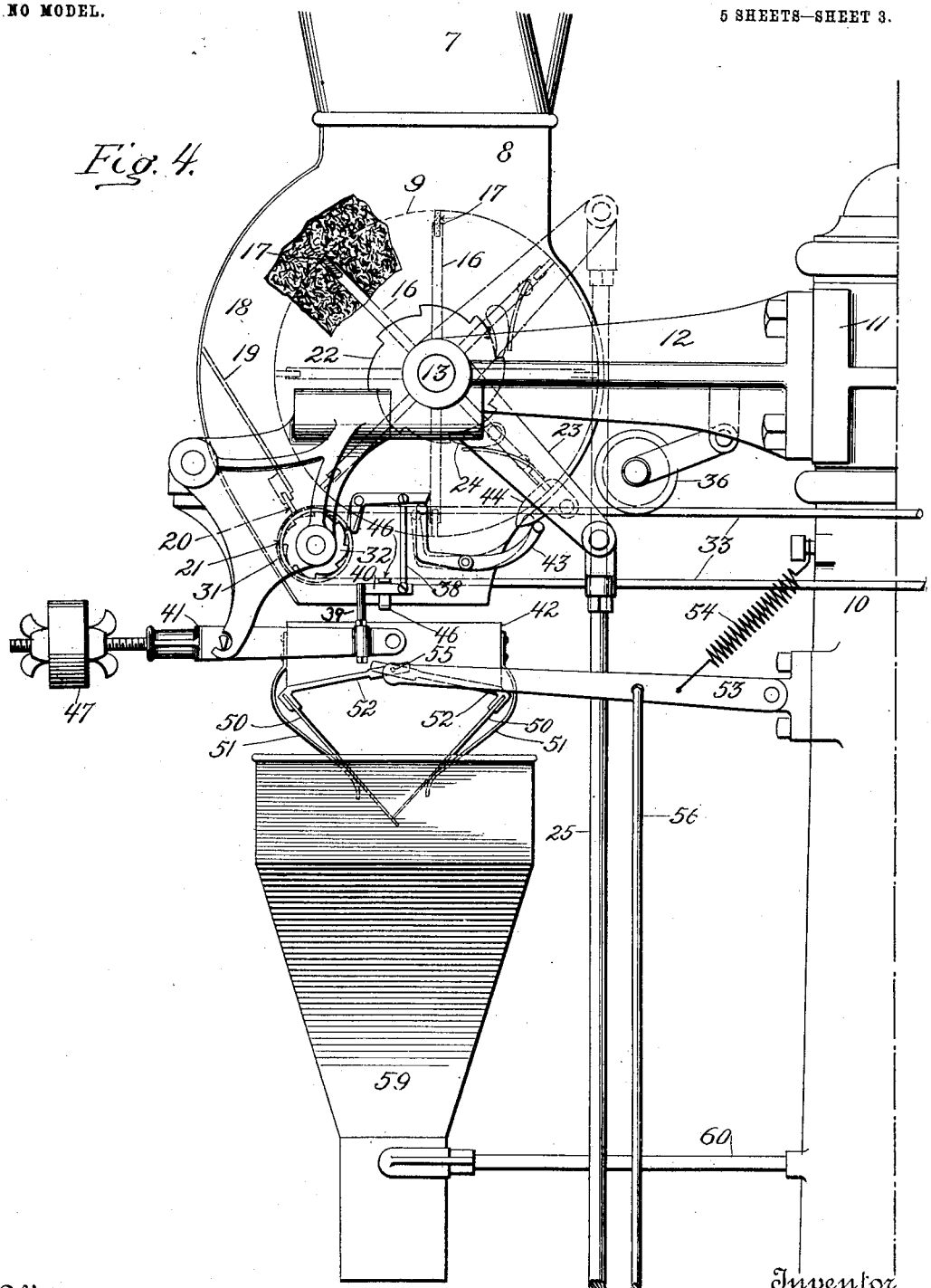
Figure 5:
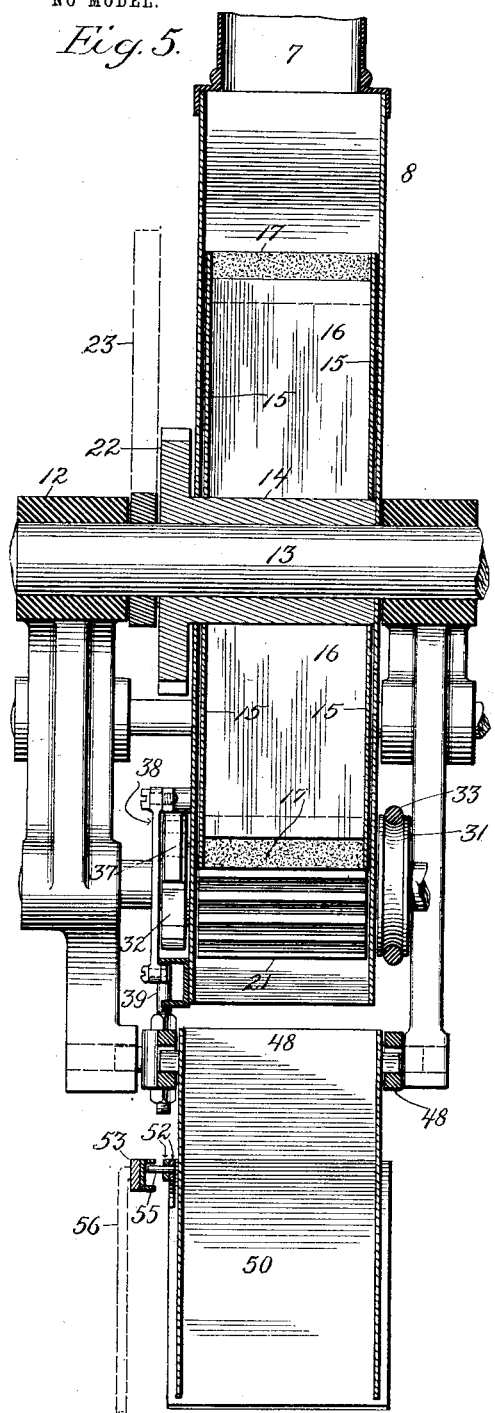

In the acccompanying drawings, illustrating this portion of my apparatus, Figure 1 is a perspective view of the feed-hoppers for supplying material to the machine. Fig. 2 is a detail view showing the lower end of one of the hoppers and indicating the manner in which it is shut off or prevented from feeding; Fig. 3, a side elevation of the measuring and weighing apparatus, the filling, packing, and labeling mechanism being omitted; Fig. 4, a side elevation of the measuring and weighing mechanism, on a larger scale, the side of the shell or casing being broken away to show the interior; Fig. 5, a partly-sectional view of said mechanism, taken at right angles to Fig. 4; Figs. 6, 7, 8, and 9, end and face elevations of different forms of feed or delivery cylinders for adding to the main charge the small quantity necessary to complete it; Fig. 10, an elevation with the casing of the measuring device broken away and showing a modification thereof for handling fine-cut tobacco and similar substances.

*General outline of machine.*—It will conduce to clearness and facility of understanding to briefly describe the machine as a whole and thereafter to explain its various groups of mechanism in detail, taking them in the order in which the tobacco or other merchandise reaches and is acted upon by each.

In the handling of tobacco and, in fact, with many other matters it is found expedient to place the stock of material on an upper floor and the packing and labeling mechanism on a lower floor, suitable spouts or chutes leading from the bin or stock-hopper to the measuring mechanism.

The present machine employs for measuring a wheel or wheels with buckets or compartments of predetermined size and mechanism for moving said wheels, so as to employ one or more than one of the compartments at each operation, according to the intended size of the package. The extent of movement of the measuring wheel or wheels at each step is determined by varying the point of connection between the pawl-carrying lever through which the necessary rotation is effected and an actuating-lever of uniform throw. From the measuring-wheel the charge is delivered into a scale-pan into which is gradually delivered such additional quantity as shall bring the charge to the precise weight required, essentially as in my former patent, dated March 23, 1897, and numbered 579,546, the dumping of the scale-pan being likewise automatically and positively effected in a manner similar to that of the previous machine.

As the remaining portions of the complete machine are not involved in the present application the outline and description may terminate here.

Having thus stated the general plan of construction and operation, I shall proceed to describe in detail the parts involved herein, which for convenience may be treated under appropriate headings.

*Feed-hoppers.*—In practice it is found expedient and, in fact, almost essential to employ a plurality of measuring and weighing devices operating successively or in alternation in order that each may work slowly enough to insure perfect action, yet that there shall be such frequent delivery of charges as shall enable the packing and labeling mechanism to run rapidly, thus securing high efficiency, both as to quantity and as to quality of work. The present description contemplates four measuring and weighing mechanisms, and hence I provide four stock or supply hoppers 1 1 1 1, as seen in Fig. 1, each in the form of a tapering or funnel-shaped bag open at the lower end. Each hopper is provided at its upper end with a hoop or ring 2, by which it is kept expanded and by or from which to suspend it. The several hoppers are arranged about a standard 3, furnished with a clamp 4, by which the several hoops 2 are clasped and held, the standard being screw-threaded at its upper end to permit the clamp to be raised or lowered, as required. Each hoop is further supported at its outer side by an adjustable standard 5 of the character shown—that is to say, composed of two parts, one longitudinally adjustable upon and relatively to the other. The lower or delivery end of each hopper hangs over an opening 6 in the floor, upon which the standards are secured, and from each of these openings a spout or trunk 7, Fig. 1, extends down to the shell or casing 8 of one or another of the measuring-wheels 9. In practice it is found advisable to maintain the delivery ends of the hoppers slightly above the level of the floor, as by so-doing the air is allowed to enter the opening 6, and tobacco which otherwise tends to bridge across the opening is caused to pass freely down the spout or trunk. A similar result may be attained by making the opening 6 somewhat larger than the end of the hopper, which latter may in such case extend slightly into the opening. The hoppers are by preference made of some woven or textile fabric, which being flexible yields to pressure in different directions and in great measure prevents the clogging or bridging of the material within the hopper. The slight but constant vibration of the floor occasioned by running machinery in the building is found to be sufficient to keep the material moving downward in the hoppers. To enable the operator or attendant to cut off the flow of any hopper at will for repairs or for other purposes, the lower end of each is furnished with a hook and eye or equivalent fastening, whereby the end may be bent or folded upward, as in Fig. 2, and secured, as shown. This is at once simple and effective and serves also to keep the end of the hopper away from the hole, so that the trunk or spout may be readily cleared. From the spouts 7 the tobacco or other substance is delivered to the measuring devices.

The general construction and arrangement of the measuring apparatus may be seen in Fig. 3, though its details will be better understood upon referring also to Figs. 4 and 5, while certain variations or modifications are shown in Figs. 6 to 10, inclusive.

The measuring apparatus as a whole is supported by a column or standard 10, Fig. 3, rising from the main frame of the machine or from the table thereof and provided at its upper end with a horizontal bar or cross-arm 11, from which project two arms or brackets 12, in which are supported the ends of a cylindrical rod 13. This rod is or may be fixed against rotation, though this is not essential, its purpose being merely to serve as an axle for a series of measuring-wheels 9. (Seen in dotted lines in Figs. 3 and 4 and in section in Fig. 5.) Each wheel 9 has a hub 14, two circular disks 15, and a series of radial wings or partitions 16, equally spaced to form compartments of uniform size, said compartments being carefully proportioned to contain just a little less than the requisite charge of a bag or package. Each wing or partition is by preference furnished with a flexible edge piece or strip 17 to make close but yielding contact with the inner face of the shell 8 during a portion of the revolution of the wheel. As best seen in Fig. 4, the shell or casing 8 has one wall curved on an arc of a circle concentric with and almost identical in diameter with wheel 9, while its opposite wall is also concentric with said wheel, but is of greater radius. The result of this is that at one side there is a close rubbing contact of the flexible strips or edge pieces with the wall of the shell, and there is at the opposite side of the wheel a considerable space into which the material to be measured falls, so that all the pockets or compartments at that side, as well as those at the top, are open and free to receive material. As the material enters the compartments at the side of the wheel at and even below its axis, it is evident that as the wheel turns the upgoing open side will be sure to receive its full supply, which will, in fact, be somewhat pressed into the pockets or compartments.

Within the shell or casing 8 at the side at which is located the feeding or filling channel 18 there is arranged a plate or partition 19, having at its lower edge a flexible strip 20, the edge of which rests against or lies very close to the periphery of a dribbling-roll 21, located within the shell or casing close to but below wheel 9. This roll is designed to deliver into the scale-pan gradually the small quantity of material necessary to complete the charge. It turns in a direction contrary to that of wheel 9, but is locked out of action when the scale-pan is fully charged or while it is being dumped and returned to place.

The two wheels thus prevent any material from working down between them into the scale-pan.

The hub 14 of each measuring-wheel is formed or furnished with a ratchet-wheel 22 at a point outside the shell or casing and by the side of each ratchet-wheel there is hung or supported upon the rod 13 a lever 23, carrying a spring-pressed dog or pawl 24, the free end of which rests against the periphery of the ratchet-wheel and engages successively with the teeth thereof, as will readily be understood upon referring to Figs. 3 and 4. Each lever 23 is connected by a rod 25 with a second lever 26, fulcrumed on a rod 27, carried in arms or brackets near the base of column 10, and each lever 26 is provided with a stud or roller to enter a cam-groove in the side face of a disk or cam-plate 28, carried by a driven shaft 29. The grooves in the several cams are of like contour, but the several cam-plates are set at such different angular adjustments about the shaft that at each quarter-revolution of the shaft a different cam shall act upon one or another of the levers 26, the others meanwhile remaining at rest. The cam-grooves are of the form indicated in Fig. 10, comprising two concentric portions of different radius, whereby the lever 26 is quickly raised, is held in its elevated position during nearly one half a revolution, is then quickly lowered, and is retained in such lowered position during the balance of the revolution. The movements of the levers 23 of course correspond with those of levers 26, but their throw or range of movement will of course depend upon the distance from the axis of shaft or rod 27 at which the connecting-rods 25 are attached to levers 26, said levers being slotted to permit this point to be varied. When the pin or bolt 30 by which such connection is made is placed at the extreme outer end of the slot in lever 26, the lever 23 will be moved through a sufficient arc to enable its pawl or dog 24 to ride back over two teeth of the ratchet-wheel 22, and consequently to advance said wheel two teeth on the return stroke. As the teeth of the ratchet-wheel correspond in number with the compartments of wheel 9, it follows that an equal number of compartments will be carried to the discharge-point and emptied, or two in the case described. When, however, the pin or bolt 30 is set inward toward the fulcrum of lever 26, the throw of lever 23 is lessened sufficiently to prevent the pawl or dog 24 engaging a second tooth, though passing very nearly the requisite distance. As a consequence of such adjustment the measuring-wheel will be advanced only far enough to carry one compartment to the discharge-point, and hence the contents of only one compartment will be delivered into the scale-pan. In this way the machine can be quickly set or adjusted to charge bags or packages of either of two sizes, and this without making the ratchet-teeth unduly small or light. If desired, still greater range of adjustment may be provided, in which case a larger number of changes may be made in the quantity delivered at each actuation of the measuring-wheels.

Each dribbling-roll 21 carries upon its end or upon its shaft a grooved pulley 31 and a ratchet-wheel 32, these being preferably arranged at opposite ends of the roll, though this is not essential. A light driving-belt 33, preferably of circular cross-section, transmits motion to the pulley 31 from a pulley on a counter-shaft 34, which is driven by belting either directly or mediately from the main driving-shaft 35 of the machine. The belts 33 are left a little slack, so that they may readily slip about the pulleys 31 when it is desired to hold the dribbling-rolls out of action, it being understood, of course, that each is driven independently of the others. To maintain the requisite driving-friction at all times when the rolls are not locked against rotation, I provide a belt-tightener in the form of a gravitating pulley 36, Fig. 4, which, however, yields readily when the roll 21 is locked, and thereby permits the belt 33 to slip upon and about the pulley 31.

37 indicates a locking dog or lever of elbow form, pivoted to the side of the measuring-wheel shell or casing 8, and tending, through the action of gravity, to engage the teeth of ratchet-wheel 32 of the dribbling-roll, and thus to hold said roll against rotation. The horizontal arm of dog or lever 37 is connected by suitable intermediate rods 38 or 39 and connecting-bar 40 with the yoke-shaped scale-beam 41, which supports a scale-pan 42 beneath the measuring apparatus. The connecting-bar 40 is a horizontal bar rigidly attached to the rod 39, which latter is screw-threaded, passed through a perforated lug or boss on the side of the scale-beam, and held at any proper adjustment relatively thereto by nuts applied to the threaded stem above and below said lug or boss, as seen in Figs. 4 and 5. Rod 38 is pivotally connected at its ends to the rigid bar 40 and to the long arm of the dog 37. When the scale-beam descends, the point or locking end of dog or lever 37 will be thrown into engagement with ratchet-wheel 32, and when the scale beam and pan rise it will be thrown out of engagement, thus releasing the dribbling-roll and permitting it to rotate.

Pivoted to the side of shell or casing 8 is a bent lever 43, one end of which extends beneath the horizontal arm of dog or lever 37 and the other end of which is located in the path of a spur or finger 44, carried by lever 23. As lever 23 descends to dump or discharge the contents of one or more of the compartments the spur or finger 44 depresses the rear end of lever 43, elevates its forward end, thereby lifting the horizontal arm of dog or lever 37 and withdrawing said dog from engagement with ratchet-wheel 32 if it be not already retracted. The lever 43 thus actuated and temporarily held by the spur or finger 44 also serves to sustain the scale-beam 41 and its pan against the impact or the momentum of the charge falling into the pan; but the cam 28 is so set with reference to the measuring-wheel and other parts that after a little time the lever 23 is again lifted, leaving the scale-beam and its pan free to descend and the dog or lever 37 free to engage and lock the dribbling-roll.

As seen in Fig. 4, the bar 40 plays between two stops 45 and 46, which limit the vibration of the scale-beam, and the lower one of which forms a support for the end of said beam while the gates or hinged bottom plates of the scale-pan are being forced open.

*Weighing apparatus.*—The scale-beam 41 is provided with an adjustable weight 47, which may be set to accurately balance the beam, scale-pan and charge, and so much of the weight of the dogging devices of roll 21 as falls upon the beam. The scale-beam is hung upon knife-edge bearings in arms or hangers extending downward from the arms 12, which carry the measuring mechanism.

42 indicates a scale-pan, of which there is one for each measuring-wheel. The pans are preferably of rectangular form and provided each with two hinged gates or bottom plates 50, which are sustained against the weight of the charge and normally held closed by springs 51 in essentially the same manner as in my former machine. Each gate or bottom plate 50 is furnished with a lever 52, the two levers of each scale-pan extending inward and lapping past each other, as seen in Fig. 4. A pin 55 projects from one lever through a slot in the other and enters a recess in a lever 53, which is fulcrumed on column 10 and is normally held up by a spring 54. The recess in the free end of lever 53 is of such size as to clear the pin 55 when the pan is in its normal position, so that no part of the weight of lever 53 and no pressure of spring 54 comes upon said pin at such time, this arrangement being similar to that of the former machine. For the purpose of opening the gates of the scale-pans at proper times each lever 53 is connected by a rod 56 with a similar lever 57, fulcrumed on rod 27, and each cam-plate 28 is furnished with stud or pin 58, Fig. 3, which at a certain point in the rotation of the disk bears upon and depresses lever 57. This lever drawing down the lever 53 through rod 56 and overcoming the tension of spring 54 causes said lever 53 to act upon pin 55 and to swing open the gates or bottom plates of pan 42 against the resistance of springs 51, the scale-beam being at the time sustained by the stop 46, to which bar 40 descends when the pan becomes fully charged and tips the beam. In descending, the beam causes locking-dog 37 to engage ratchet-wheel 32, and thus to hold dribbling-roll 21 against rotation.

All the parts are so set or adjusted that the several measuring and weighing mechanisms operate in regular succession, one at each quarter-revolution of shaft 29, when four are used.

It is obvious that a greater or lesser number of measuring and weighing mechanisms may be employed, in which event the frequency of operation will be varied to correspond.

The several scale-pans discharge into a common hopper or funnel 59, carried by an arm 60, projecting from column 10, as seen in Figs. 3 and 4. Column 10 rises from a bed or table 61, supported by the main frame 62 of the machine.

Figure 6:
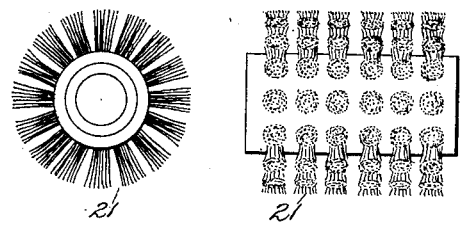
Figure 7:
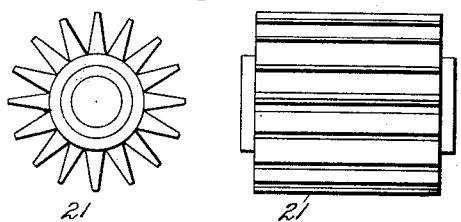
Figure 8:
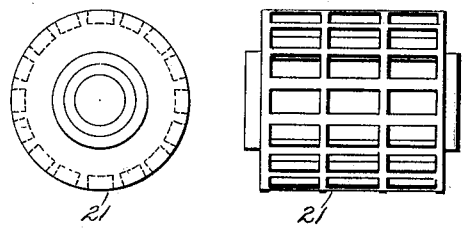
Figure 9:
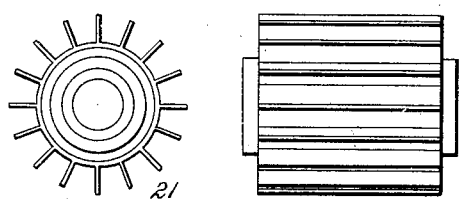

*Modifications.*—Numerous variations or modifications of parts of the mechanism are permissible and will in some cases be necessary to adapt the machine to the handling of different products. Granulated tobacco is best measured by the pocketed wheel shown and described; but fine-cut tobacco will not feed readily into such a measure. For this and similar commodities I propose to employ instead of the pocketed wheel 9 an endless belt 395, Fig. 10, which may be made of any suitable flexible material and provided with cross-ribs, teeth, or projections 396 to draw the material out from the hopper above. The belt-rolls, or one of them, may be turned a given distance at stated periods by mechanism essentially or exactly like that employed to turn the pocketed measuring-wheel, or it may be geared to a roll 397, corresponding to the dribbling-roll 21 of the first-described measuring apparatus and having the same friction-gear and throw-out devices, all as shown in Fig. 10. The roll 397 may take any form suited to coöperate with belt 395, several forms (designated 397', 397², 397³, and 397⁴) being shown in Figs. 6, 7, 8, and 9 and designed to be used interchangeably with either the pocketed wheel or the belt, according to the character of the product handled. The brush-roll shown in Fig. 6 is suited to clear the belt when using dry powders and will work well with the pocketed wheel with certain classes of substances. Numerous other variations are permissible within the scope and spirit of my invention.

Having thus described my invention, what I claim is—

1. In combination with flexible hoppers 1, having spreading hoops 2, threaded standard 3, clamp 4, and vertically-adjustable standards 5, all substantially as shown and described.

2. The herein-described measuring device consisting of a wheel having a series of pockets of definite and like capacity; and means substantially such as described and shown for rotating the wheel to different determinate distances at each operation, whereby one or more pockets may be emptied at each operation.

3. In combination with a wheel having a series of pockets; a ratchet-wheel; a pawl-carrier; a pawl mounted upon said carrier; and means for varying the throw of the pawl-carrier to cause the pawl to ride back over one tooth or more than one and to advance the wheel to discharge a corresponding number of pockets, substantially as shown and described.

4. In combination with a pocketed measuring-wheel, provided with a ratchet-wheel; a pawl-carrier; a pawl movable with the carrier and adapted to engage and turn the ratchet-wheel; an actuating-lever for moving the pawl-carrier; a rod connected with the pawl-carrier and adjustably connected with the actuating-lever; and a cam for moving said lever, the adjustable connection of the rod with the lever permitting the stroke of the pawl-carrier to be varied to determine the number of pockets of the measuring-wheel brought to the delivery-point.

5. In a machine for measuring and weighing merchandise, the combination of a pocketed measuring-wheel; a hopper inclosing said wheel and having one of its walls conforming closely to the periphery thereof; a ratchet-wheel 22 applied to the axle of said measuring-wheel; a pawl-carrier 23 provided with pawl 24; rod 25; slotted lever 26; and cam 28 for actuating said lever, whereby the throw of the pawl-carrier may be varied and the pocketed wheel thereby caused to deliver at each movement a predetermined and definite quantity of material.

6. In combination with a pocketed measuring-wheel and means for rotating the same progressively, a hopper having one of its walls conforming closely to the periphery of said wheel; a dribbling-roll; driving-gear for said roll; a scale-pan; and mechanism connected with the scale-pan and and serving to stop the rotation of the roll when the scale-pan descends.

7. In combination with a shell or casing 8, a pocketed measuring-wheel 9 having its periphery arranged to travel in close proximity to one of the walls of said shell or casing; means, substantially as shown, for rotating said wheel; a dribbling-roll 21; a scale-beam 41; a dog 37 adapted to hold the dribbling-roll against rotation; and connections such as shown and described between the scale-beam and the dog, whereby the latter is held out of engagement when the scale-beam is elevated and is drawn into engagement when the beam is lowered.

8. In combination with a pocketed measuring-wheel provided with a ratchet-wheel; a pawl adapted to engage with and to rotate said ratchet-wheel; a pawl-carrier for supporting and actuating said pawl; a dribbling-roll provided with a ratchet-wheel; a dog adapted to engage said ratchet-wheel and hold the dribbling-roll against rotation; a lever adapted to withdraw the dog from engagement with the ratchet-wheel; and a projection upon the pawl-carrier adapted to engage the lever and to move the same to withdraw the dog from the ratchet.

9. In combination with measuring-wheel 9 provided with ratchet-wheel 22; pawl-carrier 23 provided with pawl 24 and finger 44; dribbling-roll 21 provided with ratchet-wheel 32; scale-beam 41; dog 37 adapted to engage with ratchet-wheel 32; a connection between the scale-beam and said dog; and a lever 43 interposed between the dog 37 and the finger 44 and adapted when acted upon by said finger to withdraw the dog from engagement with the ratchet-wheel 32.

10. In combination with shell or casing 8 and measuring-wheel 9; partition 19 provided with flexible edge 20; dribbling-roll 21; and means for imparting rotation to the measuring-wheel and to the dribbling-roll.

11. In combination with scale-beam 41 and its pan 42, stops 45 and 46; bar 40 carried by the scale-beam and playing between said stops; a lever 53 connected with the scale-pan and serving to positively discharge the same; and means, substantially as shown and described, for actuating said lever.

12. In combination with scale-beam 41 carrying pan 42; stops 45 and 46; bar 40 carried by the scale-beam and arranged to play between said stops; pivoted gates 50 applied to the scale-pan; a lever 53 having a loose connection with said gates; a spring 54 serving normally to elevate the lever 53; a cam 28; a lever 57 actuated by said cam; and a rod 56 connecting the levers 57 and 53, substantially as and for the purpose set forth.

13. In combination with the continuously-rotating shaft 34 provided with a pulley; a dribbling-roll 21 provided with a pulley 31 and with a ratchet-wheel 32; a belt 33 connecting the two pulleys; a dog or detent adapted to engage the ratchet of the dribbling-roll; and a belt-tightener acting upon the belt 33 and serving to tighten the same sufficiently to drive the dribbling-roll when the latter is not locked by the dog or detent.

In testimony whereof I have signed my name to this specification in the presence of two subscribing witnesses.

RUFUS L. PATTERSON.

Witnesses:
F. N. de Lassit,
M. M. Whedbee.